US012580449B2

(12) United States Patent
Radovinsky et al.

(10) Patent No.: US 12,580,449 B2
(45) Date of Patent: Mar. 17, 2026

(54) COOLING SYSTEM FOR SUPERCONDUCTING WIND POWER GENERATOR

(71) Applicants: Massachusetts Institute of Technology, Cambridge, MA (US); Commonwealth Fusion Systems LLC, Devens, MA (US)

(72) Inventors: Alexey Radovinsky, Cambridge, MA (US); Alexander Zhukovsky, Brighton, MA (US)

(73) Assignees: Massachusetts Institute of Technology, Cambridge, MA (US); Commonwealth Fusion Systems LLC, Devens, MA (US)

( * ) Notice: Subject to any disclaimer, the term of this patent is extended or adjusted under 35 U.S.C. 154(b) by 0 days.

(21) Appl. No.: 18/685,410

(22) PCT Filed: Aug. 30, 2022

(86) PCT No.: PCT/US2022/041979
§ 371 (c)(1),
(2) Date: Feb. 21, 2024

(87) PCT Pub. No.: WO2023/034257
PCT Pub. Date: Mar. 9, 2023

(65) Prior Publication Data
US 2025/0239913 A1 Jul. 24, 2025

Related U.S. Application Data

(60) Provisional application No. 63/239,194, filed on Aug. 31, 2021.

(51) Int. Cl.
*H02K 7/18* (2006.01)
*H02K 9/14* (2006.01)
*H02K 55/00* (2006.01)

(52) U.S. Cl.
CPC ............... *H02K 7/183* (2013.01); *H02K 9/14* (2013.01); *H02K 55/00* (2013.01)

(58) Field of Classification Search
CPC ........... H02K 7/183; H02K 9/14; H02K 55/00
See application file for complete search history.

(56) References Cited

U.S. PATENT DOCUMENTS

| | | | |
|---|---|---|---|
| 4,101,793 A | 7/1978 | Berthet et al. | |
| 5,773,910 A | 6/1998 | Lange | |

(Continued)

FOREIGN PATENT DOCUMENTS

| | | |
|---|---|---|
| CA | 2 374 326 | 1/2001 |
| CN | 109102986 | 12/2018 |

(Continued)

OTHER PUBLICATIONS

Choi et al., "A novel no-insulation winding technique of high temperature-superconducting racetrack coil for rotating applications: A progress report in Korea university", Review of Scientific Instruments, vol. 87, No. 10, Oct. 7, 2016; 13 pages.

(Continued)

*Primary Examiner* — Sean Gugger
(74) *Attorney, Agent, or Firm* — Daly, Crowley, Mofford & Durkee, LLP

(57) ABSTRACT

Techniques are described for a wind power generator in which a refrigerant such as liquid helium and/or helium gas is applied to superconducting magnets via thermally conductive flexible structures. These structures thermally couple the refrigerant channels to the magnets, and/or to a thermally conductive structure (e.g., metal plate) to which the magnets are thermally coupled. The thermally conductive flexible structures may be arranged so that motion of the magnets relative to the cryogenic channels that cool the structures during heating and/or cooling of the magnets does (Continued)

Stationary Stage                                                    Rotary Stage not result in damage to the thermal connection between the channels and the magnets. The stationary stage of the generator may house a cooling station, and transfer the refrigerant to the rotary stage via a suitable rotary union.

19 Claims, 4 Drawing Sheets

(56) References Cited

U.S. PATENT DOCUMENTS

| | | | |
|---|---|---|---|
| 2006/0266054 A1* | 11/2006 | Steinbach | F25D 16/00 |
| | | | 62/79 |
| 2008/0143202 A1 | 6/2008 | Whitener et al. | |
| 2009/0229291 A1 | 9/2009 | Winn | |
| 2009/0275477 A1* | 11/2009 | Roth | H01F 6/04 |
| | | | 62/51.1 |
| 2010/0133943 A1* | 6/2010 | Winn | H02K 3/47 |
| | | | 310/194 |
| 2012/0306212 A1* | 12/2012 | Sarmiento | F03D 9/25 |
| | | | 290/55 |
| 2013/0181553 A1 | 7/2013 | Wu et al. | |
| 2017/0133900 A1* | 5/2017 | Guina | H02K 21/02 |
| 2021/0270239 A1 | 9/2021 | Torrey et al. | |
| 2024/0088773 A1 | 3/2024 | Radovinsky et al. | |

FOREIGN PATENT DOCUMENTS

| | | |
|---|---|---|
| EP | 1 247 325 | 10/2005 |
| EP | 1 672 300 | 6/2006 |
| EP | 2 521 252 | 8/2014 |
| EP | 3 186 505 | 1/2020 |
| JP | 2011103708 | 5/2011 |
| JP | 2017175031 | 9/2017 |
| WO | WO 2008/011184 | 1/2008 |
| WO | WO 2020/005222 | 1/2020 |

OTHER PUBLICATIONS

Song et al., "Designing and Basic Experimental Validation of the World's First MW-Class Direct-Drive Superconducting Wind Turbine Generator", IEEE Transactions of Energy Conversion, vol. 34, No. 4, Dec. 2019; 8 pages.

PCT International Search Report and Written Opinion dated Dec. 7, 2022 for International Application No. PCT/US2022/041979; 15 pages.

Office Action dated Jul. 17, 2024 for U.S. Appl. No. 18/263,630; 20 pages.

Response to Office Action dated Jul. 17, 2024 for U.S. Appl. No. 18/263,630; Response filed Dec. 17, 2024; 16 pages.

Final Office Action dated Jan. 7, 2025 for U.S. Appl. No. 18/263,630; 22 pages.

European Communication pursuant to Rule 112(1) EPC dated Oct. 30, 2024 for European Patent Application No. 22777428.8; 3 pages.

Response to European Communication pursuant to Rule 112(1) EPC dated Oct. 30, 2024 for European Patent Application No. 22777428.8; Response filed Dec. 17, 2024; 33 pages.

Kalsi; "Superconducting Wind Turbine Generator Employing MgB2 Windings Both on Rotor and Stator"; IEEE Transactions on Applied Superconductivity; vol. 24; No. 1; Feb. 2014; 7 Pages.

PCT Search Report and Written Opinion of the ISA dated May 30, 2022 for International Application No. PCT/US2022/015572; 17 Pages.

Korean Request for Examination (with English translation) dated Aug. 18, 2025 for Korean Patent Application No. 10-2024-7007767; 4 pages.

Korean Voluntary Amendment (with English translation) dated Aug. 18, 2025 for Korean Patent Application No. 10-2024-7007767; 14 pages.

Japanese Request for Examination (with English translation) dated Aug. 25, 2025 for Japanese Patent Application No. 2024-513112; 2 pages.

Japanese Voluntary Amendment (with English translation) dated Aug. 25, 2025 for Japanese Patent Application No. 2024-513112.

Notice of Allowance dated Jun. 24, 2025 for U.S. Appl. No. 18/263,630; 7 Pages.

Notice of Appeal dated May 29, 2025 for U.S. Appl. No. 18/263,630; 10 Pages.

Response to U.S. Final Office Action dated Jan. 7, 2025 for U.S. Appl. No. 18/263,630; Response Filed Apr. 4, 2025; 19 Pages.

* cited by examiner

Rotary Stage

COOLING SYSTEM FOR SUPERCONDUCTING WIND POWER GENERATOR

CROSS REFERENCE TO RELATED APPLICATIONS

This application is a 371 U.S. National Stage application of International Patent Application PCT/US2022/041979 filed in the English language on Aug. 30, 2022, and entitled Cooling System For Superconducting Wind Power Generator which claims the benefit of U.S. Provisional Application No. 63/239,194, filed on Aug. 31, 2021.

STATEMENT REGARDING FEDERALLY SPONSORED RESEARCH

Not applicable.

BACKGROUND

A wind turbine uses an electrical generator to convert kinetic energy from wind into electrical energy. A turbine typically includes fins or other structures coupled to a rotor that are driven by the wind, thereby causing the rotor to rotate. The electrical generator comprises magnets housed in the rotor, the rotation of which produces an electrical current in an armature.

Some wind turbines utilize strong permanent magnets, whereas some utilize electromagnets. In the latter case, a wind turbine may comprise superconducting magnets, which can be very efficient as a result of being able to carry current without loss. However, superconducting materials must be cooled to low temperatures to operate in this manner.

SUMMARY

According to some aspects, a wind power generator is provided comprising a plurality of high temperature superconducting (HTS) magnets arranged in a loop, a plurality of thermally conductive, flexible structures, each thermally conductive, flexible structure being thermally coupled to one or more of the plurality of HTS magnets in the loop, and a gas channel comprising an inlet portion extending radially outward from a center region of the loop, a circumferential portion coupled to the inlet portion and thermally coupled to at least some of the plurality of thermally conductive, flexible structures, and an outlet portion coupled to the circumferential portion and extending radially inward to the center region of the loop.

According to some aspects, a wind power generator is provided comprising a cooling system comprising a rotary portion having a gas inlet and a gas outlet with a gas channel coupled between the gas inlet and the gas outlet, a stationary portion having a gas outlet and a gas inlet, the stationary portion configured to provide cooled gas at the outlet thereof, a rotary union coupled between the rotary portion and stationary portion, the rotary union having a first channel in fluid communication with the gas outlet of the stationary portion and with the gas inlet of the rotary portion and having a second channel in fluid communication with the gas outlet of the rotary portion and the gas inlet of the stationary portion, and a plurality of thermally conductive, flexible structures, each thermally conductive, flexible structure being thermally coupled to at least a portion of the rotary portion.

According to some aspects, a cooling system for a wind power generator is provided, the cooling system comprising a stationary portion having a first inlet configured to receive a coolant gas from a coolant source, a first outlet configured to provide a gas to an input of a rotary union and a second inlet configured to receive a gas from an output of a rotary union with the a temperature of the gas at the first outlet being less than a temperature of the gas at the second inlet, the stationary portion comprising a cryostat, a thermal radiation shield disposed within in the cryostat, a gas channel provided within the thermal radiation shield and having a first inlet corresponding to the first inlet of the stationary portion, a first outlet corresponding to the first outlet of the stationary portion and a second inlet corresponding to the second inlet of the stationary portion, a first plurality of colds heads thermally coupled to the gas channel, a compressor coupled to the first plurality of colds heads thermally coupled to the gas channel, a cold head coupled to the thermal shield, a compressor coupled to the cold head for the thermal shield, and a valve system coupled to the gas channel and configured to direct a flow of gas through the gas channel.

According to some aspects, a generator is provided comprising a plurality of high temperature superconducting (HTS) magnets arranged in a loop, a plurality of thermally conductive, flexible structures, each thermally conductive, flexible structure being thermally coupled to one or more of the plurality of HTS magnets in the loop, and a cooling channel comprising an inlet portion, a circumferential portion coupled to the inlet portion and thermally coupled to at least some of the plurality of thermally conductive, flexible structures, and an outlet portion.

According to some aspects, a wind power generator is provided comprising a cooling system comprising a rotary portion having an inlet and an outlet with a cooling channel coupled between the inlet and the outlet, a stationary portion having an outlet and an inlet, the stationary portion configured to provide cooled gas at the outlet thereof, a rotary union coupled between the rotary portion and stationary portion, the rotary union having a first channel in fluid communication with the outlet of the stationary portion and with the inlet of the rotary portion and having a second channel in fluid communication with the outlet of the rotary portion and the inlet of the stationary portion, and a plurality of thermally conductive, flexible structures, each thermally conductive, flexible structure being thermally coupled to at least a portion of the rotary portion.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
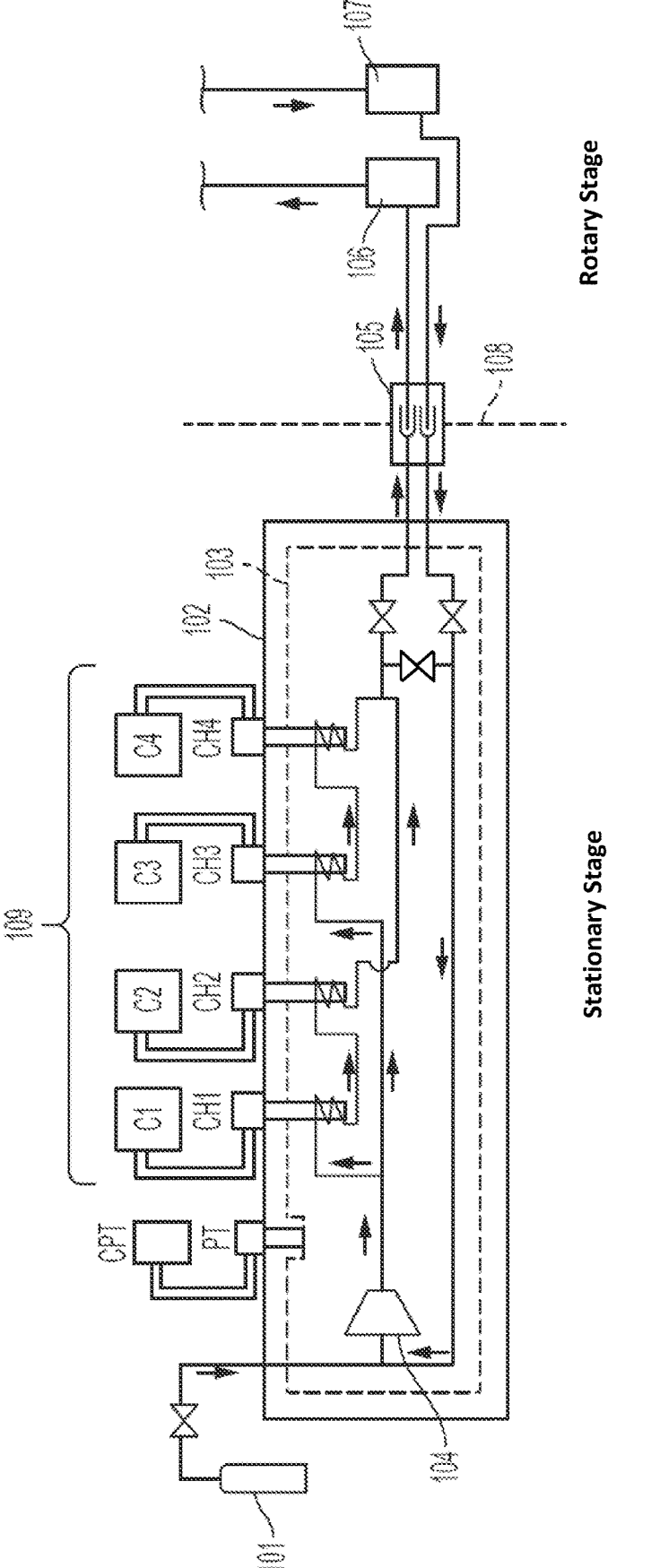
FIG. 1 is a schematic drawing of a cooling station for a cooling system, according to some embodiments.

As described above, wind turbines may comprise superconducting magnets, which require cooling to cryogenic temperatures so that the conductors in the magnets operate in a superconducting phase. As referred to herein, a superconductor or superconducting material is a material that exhibits zero electrical resistance below a critical temperature. This critical temperature may be on the order of several Kelvin for some superconductors, but for a class of materials known as High Temperature Superconductors (HTS) the critical temperature can be as high as around 90K.

Cryogenic cooling of magnets in a rotational stage of a generator (such as a wind power generator, for example) presents several challenges, however. First, installing a refrigerator in the rotational stage itself is difficult and may have reduced performance as a result of operating under centrifugal forces. As a result, a refrigerant must generally be supplied from a stationary stage and transferred into the rotational stage. Second, the refrigerant must be transferred among regions of the rotational stage (e.g., from a center of the rotational stage into an outer portion of the rotational stage), yet the size and rotational speeds of a wind turbine are such that the centrifugal forces that may otherwise aid such a transfer are comparatively small. Third, due to the difficulty in supplying refrigerant to the magnets and the low temperatures of the magnets needed for operation, uniform cooling of the magnets can be difficult to achieve.

The inventors have recognized and appreciate cooling techniques for a generator, such as a wind power generator, in which a refrigerant such as liquid helium and/or helium gas is applied to superconducting magnets via thermally conductive flexible structures. These structures thermally couple the refrigerant channels to the magnets, and/or to a thermally conductive structure (e.g., a thermally conductive surface or structure such as a metal plate) to which the magnets are thermally coupled. The thermally conductive flexible structures may be arranged so that motion of the magnets relative to the cryogenic channels that cool the structures during heating and/or cooling of the magnets does not result in damage to the thermal connection between the channels and the magnets. For example, the thermally conductive, flexible structures may allow for movement of the magnets during heating and/or cooling of the magnets so that high stresses due to differential thermal contraction/expansion in the tube-to-magnet structure are avoided.

The cooling system described herein may be more thermally efficient than cooling systems in which the magnets are within a vessel that is cooled to substantially the same operating temperature as the magnets themselves. For instance, the cooling techniques described herein may allow the vessel containing the magnets to be cooled to at around 70-80K, whereas the magnets themselves may be cooled to around 20K. Thus, the cooling techniques described herein may provide for more efficient cooling as a result of having a relatively small cooling thermal envelope. Moreover, it may be an advantage of the techniques described herein that the use of HTS magnets allows for cooling via gas and may not require the use of liquid helium. In contrast, low temperature superconductor (LTS) magnets need to operate at lower temperatures and may require liquid helium.

According to some embodiments, the cooling system may comprise a non-rotary stage in which a refrigerant (e.g., a source of gas such as compressed helium gas) is cooled to cryogenic temperatures (e.g., less than 40K) and output through a rotary union to a rotary stage having inlet and outlet manifolds for supplying the refrigerant through channels that are proximate to superconductor magnets (e.g., high temperature superconductor (HTS) coils) in a rotor. The refrigerant may transfer heat away from the magnets via the aforementioned thermally conductive, flexible structures that thermally couple the refrigerant channels to the magnets, and/or to a plate (e.g., a copper or aluminum plate) to which the magnets are thermally coupled.

Following below are more detailed descriptions of various concepts related to, and embodiments of, cooling techniques for a wind power generator. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a schematic drawing of a cooling station for a cooling system, according to some embodiments. The cooling station may be, or may be part of, the non-rotary portion of the cooling system, and may be configured to direct a refrigerant through a rotary union to the rotary stage. The cooling station may also be configured to cryogenically cool a gas to use as the refrigerant. The rotary union and inlet/outlet manifolds that supply refrigerant to cool the magnets are shown in FIG. 1, although the rotary stage itself is shown only partially in FIG. 1, as described further below.

In the example of FIG. 1, cryocooler cold heads 109 (also labeled CH1, CH2, CH3 and CH4) are located in or provided as part of a cryostat 102 with vacuum insulation and a thermal shield 103. The cryocooler cold heads installed at the cryostat 102 serve to cool helium circulated in the pictured closed loop circuit. In the example of FIG. 1, the cryocooler cold heads are connected with room temperature compressors (labeled C1, C2, C3 and C4), which drive the cryocooler cold heads. The circuit shown in FIG. 1 receives gas, which may be at ambient temperature, from a source 101, which may for example be a compressed gas source, and directs the gas through the loop. Circulation in the loop is provided by a cold blower (e.g., cryofan) 104 installed in the cryostat 102. The gas in the circuit is cooled by the cold heads 109 and the cooled gas and/or cold liquid produced as a result of the cooling (hereinafter 'refrigerant') may be provided through a rotary union 105 into a rotary stage (to the right of the vertical dashed line 108, which shows the boundary between stationary and rotational parts of the system). An inlet manifold 106 provides the refrigerant to the magnet (not shown in FIG. 1). Refrigerant returning from the rotor is sent through outlet manifold 107, back through the rotary union 105 and back to the cooling station of the closed loop. As a result, refrigerant may circulate through this system by being cooled by the cold heads, cooling the magnets in the rotor, passing back to the cryofan and then to cold heads, etc.

Each of the cold heads CH1, CH2, CH3 and CH4 is coupled to a heat exchanger (depicted as jagged lines) to provide cooling to the refrigerant flow in the circuit. The refrigerant flow through the heat exchangers can circulate in series, in parallel or both in series and parallel as shown in the example of FIG. 1. That is, in the example of FIG. 1 one channel passes CH1 and CH2 in series, while a parallel channel passes CH3 and CH4 in series. It will be appreciated that any number of cold heads may be included in the cooling system, and that four cold heads are shown merely as an example.

In some embodiments, one or more of the cold heads may include, or may otherwise be coupled to, a heater configured to control the temperature of gas flow in the circuit. During initial cooling of the magnets in the wind power generator, it may be beneficial to limit the temperature of the magnets to manage differential temperatures and thermal stresses in the magnets and associated structures (e.g., magnet housing). For example, the heater(s) may be operated to limit the temperature difference between the magnet temperature and cooling circuit temperature to below 50 K during initial cooling to around 120 K, whereas below 120 K the magnets can be more freely cooled.

In some embodiments, the refrigerant flow within the circuit shown in FIG. 1 may have a pressure of between 10-30 bars, or may have a pressure between 15-25 bars, or may have a pressure of 20 bars (or approximately 20 bars). In some embodiments, the refrigerant flow within the circuit shown in FIG. 1 may be circulated at an operating temperature of between 10K and 30K, or at a temperature between 15K and 25K, or at a temperature of 20K (or approximately 20K).

As described above, the cryofan 104 installed in the cryostat provides refrigerant circulation around the cooling circuit depicted in FIG. 1. In some embodiments, the cooling circuit may be charged by a high purity helium gas from a source 101 comprising high-pressure cylinders, which is circulated around the circuit by the cryofan 104. According to some embodiments, each cold head 109 may be coupled to a room temperature refrigerant compressor, e.g., connected with the cold head motor located at the cryostat lid with flexible hoses. Some or all of the equipment for cooling the circulating refrigerant flow may be installed at a stationary portion of the wind turbine, such as on or otherwise coupled to a platform of the wind turbine nacelle.

According to some embodiments, the cryostat 102 may comprise a bypass valve to allow for testing of its cooling characteristics without an external cooling circuit. In some embodiments, the cryostat 102 may include circuit supply and/or return valves to provide an ability to trace inlet and outlet cold tubes outside the cryostat close to each other and install them in a mutual vacuum jacketed line (VJL), which may decrease heat load to the refrigerant flow.

According to some embodiments, the cryostat thermal shield 103 may be cooled to a temperature between that of the circuit and room temperature. For example, the thermal shield may be cooled to around 80K, whereas the circuit is around 20K. In some embodiments, the thermal shield may be cooled by a small capacity pulse tube cryocooler, for instance, pulse tube PT 90 made by Cryomech, which has a capacity of 90 W at 80 K with an air-cooled compressor. Using a separate cryocooler to cool the thermal shield may eliminate the necessity to use liquid nitrogen to cool the cryostat radiation shield installed at the wind turbine nacelle.

Figure 2A:
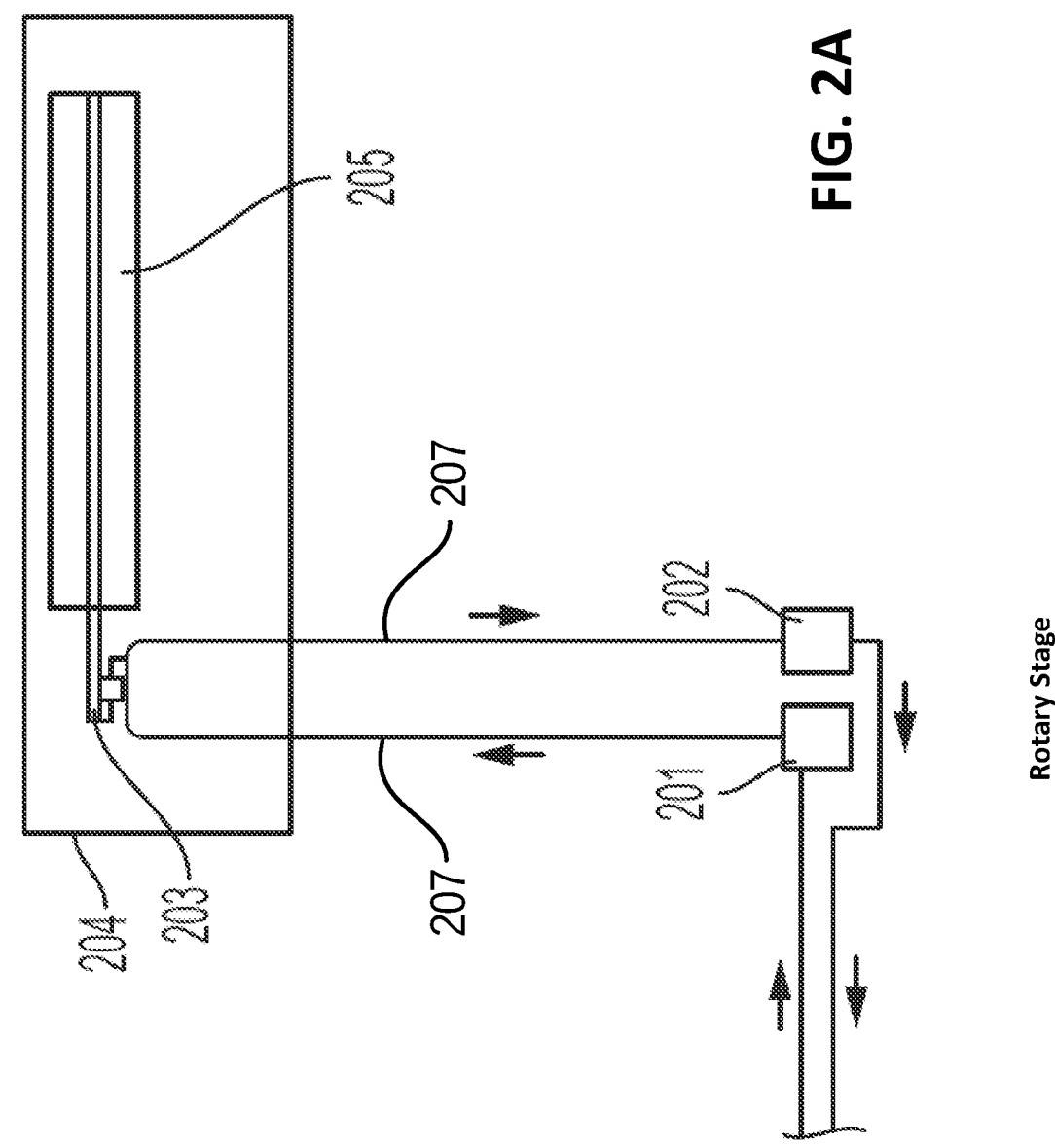
FIG. 2A is a side view in schematic form of a portion of a rotary stage having a cooling system coupled thereto.
Figure 2B:
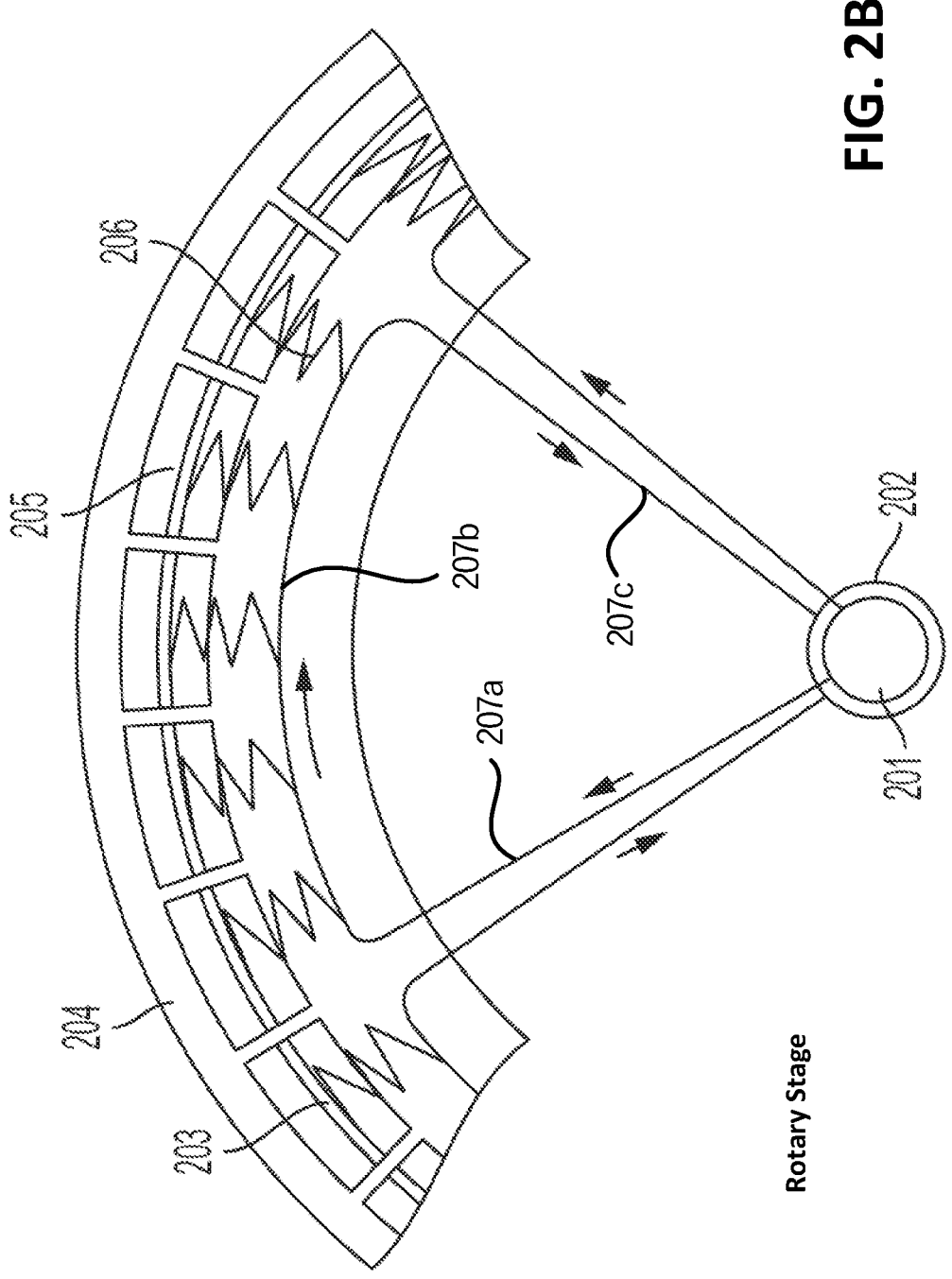
FIG. 2B is a front view in schematic form of a portion of a rotary stage illustrating a cooling scheme for the rotary stage utilizing a cooling system, according to some embodiments.

FIGS. 2A-2B illustrate the cooling scheme for the rotary stage of the cooling system, according to some embodiments. The rotary stage of the cooling system may be arranged inside a rotor of a wind turbine, which may be housed within a stator. FIG. 2A depicts a side view of the cooling scheme for the rotary stage and an illustrative rotor superconducting magnet 205, and FIG. 2B depicts a front view showing the cooling scheme in the rotary stage along with some of the rotor magnets. In each of FIGS. 2A and 2B, the helium inlet and outlet manifolds 201 and 202, respectively, are shown, which may correspond to the inlet and outlet manifolds 106 and 107, respectively, shown in FIG. 1. For clarity, only a single circulation loop is shown from the inlet manifold to the outlet manifold, although in general several such loops may be included as described further below.

As shown in FIG. 2B, refrigerant flowing from the inlet manifold 201 flows in cooling channels (sometimes referred to herein as "channels") generally denoted 207 (e.g., tubes having any desirable or convenient cross-sectional shape) toward the rotor and then back to outlet 202. In this example embodiment, the refrigerant flows in radial channels outward from a central region (e.g., a region proximate to the rotor axis), around a part of the circumference of the rotor, and back to the outlet manifold 202. This path is shown in FIG. 2A, where it can be seen that channels 207 are thermally coupled to a cooling plate 203 which may be formed from, or may comprise, a thermally conductive material. In this example embodiment, channels 207 are arranged behind the superconducting magnets 205 to cool a cooling plate 203 (e.g., a copper or aluminum plate) that is in thermal contact with the magnet or magnets. Cooling between the channels and the cooling plates may be achieved via thermally conductive, flexible structures 206, shown in FIG. 2B, which are each arranged next to a circumferential section of the channel. A plurality of cooling loops (such as the loop formed by channels 207a, 207b, 207c shown in FIG. 2B) may be provided, with each cooling loop providing cooling to one or more superconductor magnets via thermally coupled flexible structures and cooling plates. It is noted that channel portions 207a, 207c are substantially radially directed from a substantially central rotor region at which inlet and outlet manifolds 201, 202 are disposed toward rotor and HTS magnets 205 and channel portion 207b is substantially directed along a circumferential path.

According to some embodiments, the structures 206 may be formed from a thermally conductive (e.g., metal) radial tube with a circumferential part of the tube being thermally coupled (e.g., attached such as soldered) to a cooling plate 203. According to some embodiments, one or more of the flexible structures 206 may be connected to the outer diameter of a refrigerant channel and to the cooling plate 203. In some embodiments, the structures 206 may be formed as metal baffles that can expand or contract the space between the magnets and the refrigerant channel. This configuration may provide an improved thermal connection by eliminating flexes and joints in the structures. The flexibility of the radial tubes can be provided by bellows and/or by bending of the tubes. In the latter case, the bending may allow for movement of the magnets during cooling and warming of the magnets to avoid high stresses due to differential thermal contraction/expansion in the tube-to magnet structure. According to some embodiments, one of the flexible structures 206 may cool a plurality of magnet coils (e.g., 5 coils). These coils may be coupled to a common cooling plate or may be coupled to multiple cooling plates to which the flexible structure is connected.

According to some embodiments, the refrigerant channels may pass through a hermetically-insulated thermal feedthrough when entering the vacuum thermal vessel 204. Thus, cooling plate 203, HTS magnets 205, thermally conductive, flexible structures 206, and cooling channel portion 207b may be disposed in the vacuum thermal vessel 204.

In some cases, one or more of the refrigerant channels may be bent close to the location of the cooling plates. In some cases, the refrigerant channel may be bent in the radial direction and traced to the outlet manifold located near the rotor axis. In one design, the rotor magnet may comprise 60 magnet coils and 12 parallel inlet and outlet tubes to provide series and parallel cooling of all the magnets. Variation in the cooling scheme may be provided by varying the number of inlet and outlet channels that run radially; for instance, a single radial inlet tube may be provided for two neighboring magnet coils, with two radially outlet tubes returning gas to the outlet manifold.

According to some embodiments, refrigerant channels outside and inside the rotor, and/or the inlet and outlet manifolds 201 and 202 may be installed into vacuum jackets (VJLs) to provide thermal insulation. The refrigerant channels and/or manifolds may be wrapped by multi-layer insulation (MLI) and may comprise getters (e.g., charcoal getters) to improve retention of the vacuum. In some cases, for instance, VJLs for a cold helium transfer could operate for many years after a factory pump out without significant deterioration of the thermal insulated vacuum and without the need to pump out again. In some cases, the vacuum vessel may comprise getters to prolong operation at the designed vacuum without a need to pump out.

The above-described cooling system with cold gas (e.g., helium) applied just to the coil copper cooling plates may provide a design in which the thermal-vacuum envelope (vessel) around the magnets has a thermal shield maintained at elevated temperature, for instance, 70-80 K. The relatively light envelope is hanging on the magnet supports, which provide the necessary thermal resistance and related differential temperatures to the magnet temperature.

In some embodiments, the heat load to the cooling system by the current leads that supply current to the magnets 205 may be decreased by using a hybrid type of current leads, e.g., copper resistive current leads to the interval temperature 300-70 K and HTS current leads for the 70-20 K temperatures. The partial exhaust from cooling coils helium flow can be used to cool the copper current leads to about 70 K and provide a function of the low heat load HTS current leads.

Figure 3:
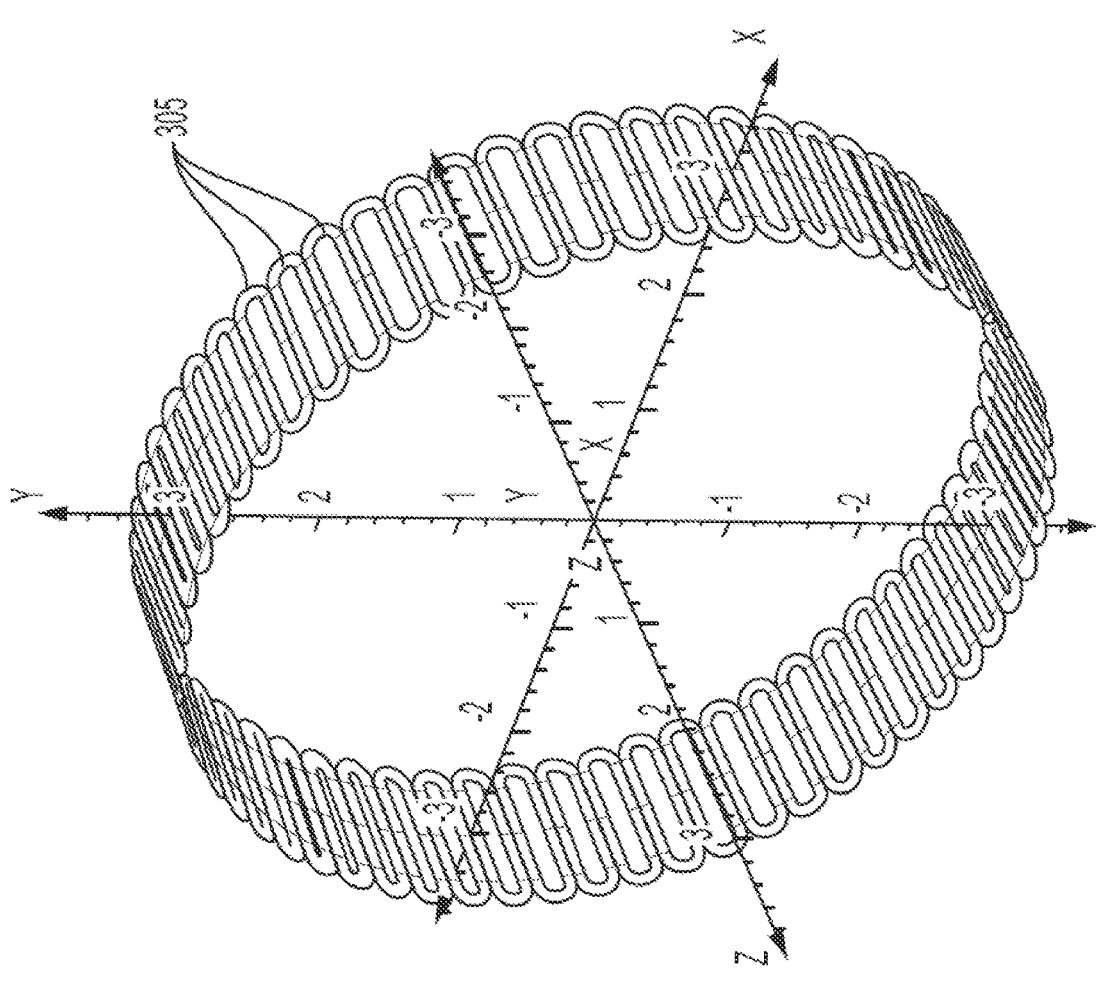
FIG. 3 depicts a view of the magnet coils in the rotor without the cooling system components, according to some embodiments.

FIG. 3 depicts a view of the magnet coils in the rotor without the cooling system components, according to some embodiments. To illustrate the shape of the magnets in the coil, a loop of magnets 305 is shown in FIG. 3. Each of the magnets may comprise a high temperature superconductor (HTS), such as a REBCO (e.g., YBCO). In some embodiments, each of the magnets 305 may comprise a stack of HTS tapes wound into a loop. In some embodiments, the magnets 305 may comprise double pancake coils. In some embodiments, the magnets may be no-insulation HTS magnets.

According to some embodiments, each of magnets 305 may comprise one or more stacks of HTS wound into one or more turns as a racetrack spiral. In the case where a magnet comprises a plurality of stacks of HTS, each of the stacks may be separated by a conventional (non-superconductor) conductor, such as steel. During a quench, the steel may allow current to flow across turns of the magnet, thereby dissipating current and mitigating damage to the HTS.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value. The term "substantially equal" may be used to refer to values that are within +20% of one another in some embodiments, within +10% of one another in some embodiments, within +5% of one another in some embodiments, and yet within +2% of one another in some embodiments.

The term "substantially" may be used to refer to values that are within +20% of a comparative measure in some embodiments, within +10% in some embodiments, within +5% in some embodiments, and yet within +2% in some embodiments. For example, a first direction that is "substantially" perpendicular to a second direction may refer to a first direction that is within +20% of making a 90° angle with the second direction in some embodiments, within +10% of making a 90° angle with the second direction in some embodiments, within +5% of making a 90° angle with the second direction in some embodiments, and yet within +2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A cooling system for a wind power generator, the cooling system comprising:

a stationary portion having a first inlet configured to receive a coolant gas from a coolant source, a first outlet configured to provide a gas to a rotary union inlet of a rotary union and a second inlet configured to receive a gas from a rotary union outlet of the rotary union with a temperature of the gas at the first outlet being less than a temperature of the gas at the second inlet, the stationary portion comprising:

a cryostat;

a thermal radiation shield disposed within in the cryostat;

a gas channel provided within the thermal radiation shield and having a first inlet corresponding to the first inlet of the stationary portion, a first outlet corresponding to the first outlet of the stationary portion and a second inlet corresponding to the second inlet of the stationary portion;

a first plurality of colds heads thermally coupled to the gas channel;

a compressor coupled to the first plurality of cold heads thermally coupled to the gas channel;

a first cold head of the first plurality of cold beads coupled to the thermal radiation shield;

a compressor coupled to the first cold head for the thermal radiation shield; and a valve system coupled to the gas channel and configured to direct a flow of gas through the gas channel; and a rotary portion comprising:

a gas inlet and a gas outlet with a cooling channel coupled between the gas inlet and the gas outlet, the cooling channel being configured to allow the gas to flow from the gas inlet of the rotary portion to the gas outlet of the rotary portion, and a plurality of thermally conductive, flexible structures, each thermally conductive, flexible structure being thermally coupled to at least a portion of the rotary portion, wherein the rotary union is coupled between the rotary portion and the stationary portion, wherein the cooling channel of the rotary union is in fluid communication with the first outlet of the stationary portion and with the gas inlet of the rotary portion and in fluid communication with the gas outlet of the rotary portion and the second inlet of the stationary portion, and wherein the plurality of thermally conductive, flexible structures is configured to allow for movement of the rotary portion.

2. The cooling system of claim 1, wherein the gas channel forms a loop such that gas entering the gas channel through the second inlet is provided to one or more of the first plurality of cold heads and cooled prior to being provided to the first outlet of the stationary portion.

3. The cooling system of claim 1, wherein the compressor is provided as a plurality of compressors with ones of the plurality of compressors coupled to ones of the first plurality of colds heads coupled to the gas channel such that each of the first plurality of colds heads has at least one compressor coupled thereto.

4. The cooling system of claim 1, wherein the compressor is provided as a first plurality of compressors such that each of the first plurality of compressors is coupled to a respective one of the first plurality of colds heads.

5. The cooling system of claim 1, further comprising a rotary union having the rotary union inlet in fluid communication with the first outlet of the stationary portion and having the rotary union outlet in fluid communication with the first inlet of the stationary portion.

6. The cooling system of claim 1, further comprising a helium cylinder coupled to the first inlet of the stationary portion.

7. The cooling system of claim 2, further comprising a rotary union having a first channel in fluid communication with the first outlet of the stationary portion and having a second channel.

8. A generator comprising:

a plurality of high temperature superconducting (HTS) magnets arranged in a loop;

a plurality of thermally conductive, flexible structures, each thermally conductive, flexible structure being thermally coupled to one or more of the plurality of HTS magnets in the loop, wherein the plurality of thermally conductive flexible structures is configured to allow for movement of the plurality of HTS magnets in the loop; and a cooling channel comprising:

an inlet portion;

a circumferential portion coupled to the inlet portion and thermally coupled to at least some of the plurality of thermally conductive, flexible structures; and an outlet portion, wherein the cooling channel is configured to allow a gas to flow from the inlet portion to the outlet portion.

9. The generator of claim 8, wherein:

the inlet portion extends radially outward from a center region of the loop; and the outlet portion extends radially inward to the center region of the loop.

10. The generator of claim 8, further comprising one or more thermally conductive plates, and wherein each of the plurality of thermally conductive, flexible structure is thermally coupled to one or more of the plurality of HTS magnets in the loop via one or more of the one or more thermally conductive plates.

11. The generator of claim 8, further comprising an inlet manifold coupled to the inlet portion of the cooling channel and an outlet manifold coupled to the outlet portion of the cooling channel.

12. The generator of claim 11, further comprising a rotary union coupled to the inlet manifold and coupled to the outlet manifold.

13. The generator of claim 12, wherein:

the cooling channel is a first cooling channel, the circumferential portion of the first cooling channel is thermally coupled to first ones of the plurality of thermally conductive, flexible structures, and the generator further comprises a second cooling channel, the second cooling channel comprising:

an inlet portion extending radially outward from a center region of the loop;

a circumferential portion coupled to the inlet portion of the second cooling channel and thermally coupled to a second subset of the plurality of thermally conductive, flexible structures; and an outlet portion coupled to the circumferential portion of the second cooling channel and extending radially inward to the center region of the loop.

14. The generator of claim 8, wherein each HTS magnet in the loop comprises a stack of HTS tapes.

15. The generator of claim 8, wherein each HTS magnet in the loop comprises a double pancake coil.

16. The generator of claim 8, wherein the plurality of thermally conductive, flexible structures each comprise a flexible radial tube.

17. A wind power generator comprising:

a cooling system comprising:

a rotary portion having a rotary portion inlet and a rotary portion outlet with a cooling channel coupled between the rotary portion inlet and the rotary portion outlet;

a stationary portion having a stationary portion outlet and a stationary portion inlet, the stationary portion configured to provide cooled gas at the stationary portion outlet thereof;

a rotary union coupled between the rotary portion and stationary portion, the rotary union having a first channel in fluid communication with the stationary portion outlet of the stationary portion and with the rotary portion inlet of the rotary portion and having a second channel in fluid communication with the rotary portion outlet of the rotary portion and the stationary portion inlet of the stationary portion, wherein the cooling channel of the rotary portion is configured to allow the cooled gas to flow from the rotary portion inlet of the rotary portion to the rotary portion outlet of the rotary portion; and a plurality of thermally conductive, flexible structures, each thermally conductive, flexible structure being thermally coupled to at least a portion of the rotary portion, wherein the plurality of thermally conductive flexible structures is configured to allow for movement of the rotary portion.

18. The wind power generator of claim 17, wherein the cooling channel of the rotary portion of the cooling system is configured such that:

a cooling channel inlet of the cooling channel extends radially outward from a center region of the rotary portion;

a circumferential portion of the cooling channel is coupled to the rotary portion inlet and thermally coupled to at least some of the plurality of thermally conductive, flexible structures; and a cooling channel outlet of the cooling channel is coupled to the circumferential portion and extends radially inward to the center region of the rotary portion.

19. The wind power generator of claim 18, wherein the rotary portion comprises plurality of high temperature superconducting (HTS) magnets arranged in a loop.

* * * * *